United States Patent
Ebeid

(10) Patent No.: US 8,050,403 B2
(45) Date of Patent: Nov. 1, 2011

(54) METHOD AND APPARATUS FOR GENERATING A PUBLIC KEY IN A MANNER THAT COUNTERS POWER ANALYSIS ATTACKS

(75) Inventor: Nevine Maurice Nassif Ebeid, Kitchener (CA)

(73) Assignee: Research In Motion Limited, Waterloo (CA)

( * ) Notice: Subject to any disclaimer, the term of this patent is extended or adjusted under 35 U.S.C. 154(b) by 916 days.

(21) Appl. No.: 12/039,998

(22) Filed: Feb. 29, 2008

(65) Prior Publication Data

US 2008/0219438 A1  Sep. 11, 2008

Related U.S. Application Data

(60) Provisional application No. 60/893,297, filed on Mar. 6, 2007.

(51) Int. Cl.
  *H04K 1/00* (2006.01)
(52) U.S. Cl. .............. 380/30; 380/28; 380/44; 380/279; 380/282
(58) Field of Classification Search .................. 380/28, 380/30, 44, 279, 282
  See application file for complete search history.

(56) References Cited

U.S. PATENT DOCUMENTS

| | | |
|---|---|---|
| 6,490,352 B1 | 12/2002 | Schroeppel |
| 6,876,745 B1 * | 4/2005 | Kurumatani ................ 380/28 |
| 7,308,096 B2 * | 12/2007 | Okeya et al. ................ 380/28 |
| 7,373,506 B2 * | 5/2008 | Asano et al. ............... 713/168 |
| 7,505,587 B2 * | 3/2009 | Izu et al. ................... 380/30 |
| 7,669,052 B2 * | 2/2010 | Asano et al. ............... 713/167 |
| 7,676,037 B2 * | 3/2010 | Jung et al. .................. 380/28 |
| 2005/0078821 A1 | 4/2005 | Jin et al. |
| 2005/0232428 A1 | 10/2005 | Little et al. |
| 2009/0074179 A1 * | 3/2009 | Futa et al. ................. 380/28 |

FOREIGN PATENT DOCUMENTS

| | | | |
|---|---|---|---|
| EP | 15848 687 A1 * | 6/2005 | |
| EP | 1548687 A1 | 6/2005 | |
| EP | 1 729 442 A2 * | 5/2006 | |
| EP | 1729442 A2 | 6/2006 | |
| EP | 1601132 B1 | 11/2006 | |
| EP | 1816624 A1 * | 11/2006 | |
| EP | 1587237 B1 | 12/2006 | |
| WO | 0135573 A1 | 5/2001 | |
| WO | WO 01/35573 A1 * | 5/2001 | |
| WO | 2007005563 A2 | 1/2007 | |

OTHER PUBLICATIONS

Ciet M. et al., "(Virtually) Free Randomization Techniques for Elliptic Curve Cryptography", Lecture Notes in Computer Science, Springer, DE, vol. 2836, Oct. 10, 2003.*

(Continued)

*Primary Examiner* — Kambiz Zand
*Assistant Examiner* — Tongoc Tran
(74) *Attorney, Agent, or Firm* — Ridout & Maybee LLP

(57) ABSTRACT

A public key for an Elliptic Curve Cryptosystem is generated in a manner that acts as a countermeasure to power analysis attacks. In particular, a known scalar multiplication method is enhanced by, in one aspect, performing a right shift on the private key. The fixed-sequence window method includes creation and handling of a translated private key. Conveniently, as a result of the right shift, the handling of the translated private key is made easier and more efficient.

13 Claims, 5 Drawing Sheets

OTHER PUBLICATIONS

Bodo Moller, "Algorithms for Multi-exponentiation", Lecture Notes in Computer Science, Springer, DE, vol. 2259, Jan. 1, 2001.*

Okeya K. et al., "Use of Montgomery Trick in Precomputation of Multi-Scalar Multiplication in Elliptic Curve Cryptosystems", IEICE Transactions on Fundamentals of Electronics, Communications and Computer Sciences, Engineering Sciences Society, Tokyo, JP, vol. E86-A, No. 1, Jan. 1, 2003.*

Okeya K. et al., "Fast Multi-scalar Multiplication Methods on Elliptic Curves with Precomputation Strategy Using Montgomery Trick", Cryptographic hardware and embedded systems, International Workship, Aug. 13, 2002.*

Theriault N., "SPA resistant left-to-right integer recordings," Jan. 1, 2006, Selected Areas in Cryptography Lecture Notes in Computer Science; LNCS, Springer, Berlin, pp. 345-358.*

Izu et al., "Improved Elliptic Curve Multiplication Methods Resistant against Side Channel Attacks", Progress in Cryptology-indocrypt. International Conference Incryptology in India, Dec. 16, 2002.*

Ciet M. et al., "Preventing differential analysis in GLV elliptic curve scalar multiplication", Cryptographic Hardware and Embedded Systems, Internationalworkship, Aug. 13, 2002.*

Gallant RP et al., "Faster Point Multiplication on Elliptic Curves with efficient Endomorphisms", Advances in Cryptography, Crypto 2001. 21st Annual international Cryptology Conference, Santa Barbara, CA, Aug. 19-23, 2001.*

Hagai Bar-El, Introduction to Side Channel Attacks White Paper, Discretix Technologies Ltd Advanced Embedded Security, www.discretix.com.

Thomas S. Messerges, Ezzy A Dabbish and Robert H Sloan, Investigations of Power Analysis Attacks on Smartcards, USENIX Workshop on Smartcard Technology, Chicago, Illinois, USA, May 10-11, 1999.

EPO, Extended European Search Report, regarding application No. 08733545.1 dated Oct. 13, 2010.

Nicolas Theriault Ed et al., SPA Resistant Left-to-Right Integer Recodings, Jan. 1, 2006, Selected Areas in Cryptography Lecture Notes in Computer Science; LNCS, Springer, Berlin, DE, pp. 345-358.

Chaehoon Lim Ed et al., New Method for Securing Elliptic Scalar Multiplication Against Side-Channel Attacks, Jun. 22, 2004, Information Security and Privacy; [Lecture Notes in Computer Science; LNCS], Springer-Verlag, Berlin/Heidelberg, pp. 289-300.

Katsuyuki Okeya et al., Efficient Representations on Koblitz Curves with Resistance to Side Channel Attacks, Jun. 30, 2005, Information Security and Privacy; [Lecture Notes in Computer Science; LNCS], Springer-Verlag, Berlin/Heidelberg; pp. 218-229.

Schroeppel R et al., Fast Key Exchange with Elliptic Curve Systems, Advances in Cryptology—Crypto '95 Santa Barbara, Aug. 27-31, 1995; [Proceedings of the Annual International Cryptology Conference (Crypto)], Berlin, Springer, DE, vol. Conf. 15, Aug. 27, 1995, pp. 43-56.

* cited by examiner

METHOD AND APPARATUS FOR GENERATING A PUBLIC KEY IN A MANNER THAT COUNTERS POWER ANALYSIS ATTACKS

CROSS REFERENCE TO RELATED APPLICATIONS

The present application claims priority to U.S. Provisional Patent Application Ser. No. 60/893,297, filed Mar. 6, 2007, the contents of which are hereby incorporated herein by reference.

The present application is related to US Patent Application Publication No. 2008/0219437, which is being filed on even date, entitled "Method and Apparatus for Performing Elliptic Curve Scalar Multiplication in a Manner that Counters Power Analysis Attacks," the contents of which are hereby incorporated herein by reference.

The present application is related to US Patent Application Publication No. 2008/0219450, which is being filed on even date, entitled "Methods And Apparatus For Performing An Elliptic Curve Scalar Multiplication Operation Using Splitting," the contents of which are hereby incorporated herein by reference.

The present application is related to US Patent Application Publication No. 2008/0275932, which is being filed on even date, entitled "Integer Division In A Manner That Counters A Power Analysis Attack," the contents of which are hereby incorporated herein by reference.

The present application is related to US Patent Application Publication No. 2008/0301458, which is being filed on even date, entitled "DPA Countermeasure for the ECDSA," the contents of which are hereby incorporated herein by reference.

The present application is related to US Patent Application Publication No. 2008/0301459, which is being filed on even date, entitled "Power Analysis Countermeasure for the ECMQV Key Agreement Algorithm," the contents of which are hereby incorporated herein by reference.

The present application is related to US Patent Application Publication No. 2008/0273694, which is being filed on even date, entitled "Combining Interleaving with Fixed-Sequence Windowing in an Elliptic Curve Scalar Multiplication," the contents of which are hereby incorporated herein by reference.

FIELD OF THE INVENTION

The present application relates generally to cryptography and, more specifically, to generating a public key in a manner that counters power analysis attacks.

BACKGROUND OF THE INVENTION

Cryptography is the study of mathematical techniques that provide the base of secure communication in the presence of malicious adversaries. The main goals of secure communication include confidentiality of data, integrity of data and authentication of entities involved in a transaction. Historically, "symmetric key" cryptography was used to attempt to meet the goals of secure communication. However, symmetric key cryptography involves entities exchanging secret keys through a secret channel prior to communication. One weakness of symmetric key cryptography is the security of the secret channel. Public key cryptography provides a means of securing a communication between two entities without requiring the two entities to exchange secret keys through a secret channel prior to the communication. An example entity "A" selects a pair of keys: a private key that is only known to entity A and is kept secret; and a public key that is known to the public. If an example entity "B" would like to send a secure message to entity A, then entity B needs to obtain an authentic copy of entity A's public key. Entity B encrypts a message intended for entity A by using entity A's public key. Accordingly, only entity A can decrypt the message from entity B.

For secure communication, entity A selects the pair of keys such that it is computationally infeasible to compute the private key given knowledge of the public key. This condition is achieved by the difficulty (technically known as "hardness") of known mathematical problems such as the known integer factorization mathematical problem, on which is based the known RSA algorithm, which was publicly described in 1977 by Ron Rivest, Adi Shamir and Leonard Adleman.

Elliptic curve cryptography is an approach to public key cryptography based on the algebraic structure of elliptic curves over finite mathematical fields. An elliptic curve over a finite field, K, may be defined by a Weierstrass equation of the form $$y^2+a_1xy+a_3y=x^3+a_2x^2+a_4x+a_6. \qquad (0.1)$$

If $K=\mathbb{F}_p$, where p is greater than three and is a prime, equation (0.1) can be simplified to $$y^2=x^3+ax+b. \qquad (0.2)$$

If $K=\mathbb{F}_{2^m}$, i.e., the elliptic curve is defined over a binary field, equation (0.1) can be simplified to $$y^2+xy=x^3+ax^2+b. \qquad (0.3)$$

The set of points on such a curve (i.e., all solutions of the equation together with a point at infinity) can be shown to form an abelian group (with the point at infinity as the identity element). If the coordinates x and y are chosen from a large finite field, the solutions form a finite abelian group.

Elliptic curves cryptosystems rely on the hardness of a problem called the elliptic curve discrete logarithm problem (ECDLP). Where P is a point on an elliptic curve E and where the coordinates of P belong to a finite field, the scalar multiplication kP, where k is a secret integer, gives a point Q equivalent to adding the point P to itself k times. It is computationally infeasible, for large finite fields, to compute k knowing P and Q. The ECDLP is: find k given P and Q (=kP).

In operation, a device implementing an Elliptic Curve Cryptosystem selects a value for a secret key, k, which may be a long term secret key or a short term secret key. Additionally, the device has access to a "base point", P. The device then generates Q=kP and publishes Q as a public key. Q may then be used for encryption or may then be used in a key agreement protocol such as the known Elliptic Curve Diffie-Hellman (ECDH) key agreement protocol or the known Elliptic Curve Menezes-Qu-Vanstone (ECMQV) key agreement protocol.

BRIEF DESCRIPTION OF THE DRAWINGS

Reference will now be made to the drawings, which show, by way of example, embodiments of the invention and in which.

DETAILED DESCRIPTION OF THE EMBODIMENTS

Figure 1:
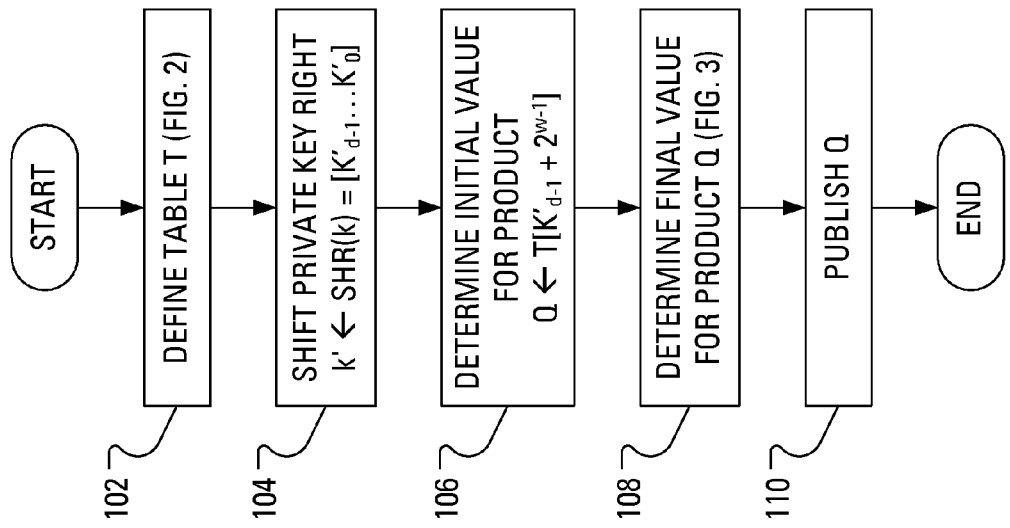
FIG. 1 illustrates steps of an example method of publishing a public key according to an embodiment.

The general point of an attack on a cryptosystem is to determine the value of the private key, k. Recently, especially given the mathematical difficulty of solving the ECDLP, cryptosystem attacks have been developed that are based on careful measurements of the physical implementation of a cryptosystem, rather than theoretical weaknesses in the algorithms. This type of attack is called a "side channel attack". In one known example side channel attack, a measurement of the exact amount of time taken by known hardware to encrypt plain text has been used to simplify the search for a likely private key. Other examples of side channel attacks involve measuring such physical quantities as power consumption, electromagnetic leaks and sound. Many side channel attacks require considerable technical knowledge of the internal operation of the system on which the cryptography is implemented. In particular, a power analysis attack involves obtaining information useful to the determination of a private key by observing properties of electricity in the power lines supplying hardware implementing the cryptosystem or by detecting electromagnetic emanations from the power lines or said hardware.

In a Simple Power Analysis (SPA) attack, an attacker monitors the power consumption of a device to visually identify large features of the generation of the public key Q through the scalar multiplication operation, kP. Indeed, monitoring of the power consumption during a scalar multiplication operation may enable an attacker to recognize exact instructions as the instructions are executed. For example, consider that the difference between the power consumption for the execution of a point doubling (D) operation and power consumption for the execution of a point addition (A) operation is observable. Then, by investigating one power trace of a complete execution of a double-and-add algorithm employed to perform a scalar multiplication, the bits of the scalar private key k may be revealed. In particular, whenever a D operation is followed by an A operation, the corresponding bit $k_i=1$, otherwise if a D operation is followed by another D operation, then $k_i=0$. A sequence of doubling and adding point operations is referred to as a DA sequence.

It would be desirable to generate a public key by performing a scalar multiplication operation for which a Simple Power Analysis does not provide useful information about the private key.

A public key for an Elliptic Curve Cryptosystem is generated in a manner that counters SPA attacks. In particular, a known scalar multiplication method is enhanced by, in one aspect, performing a right shift on the private key. The fixed-sequence windows method includes creation and handling of a translated private key. Conveniently, as a result of the right shift, the handling of the translated private key is made easier and more efficient.

In accordance with an aspect of the present application there is provided a method of generating a public key Q for an Elliptic Curve Cryptosystem given a private key k, a base point P and a window size w. The method includes defining a table of odd multiples of the base point, shifting the private key right to create a shifted private key and translating the shifted private key to a base $2^w$, thereby forming a translated, shifted key. The method also includes determining, based on the translated, shifted key and the table, an initial value for a scalar multiplication of the private key k and the base point P, determining, based on the translated, shifted key and the table, a final value for the scalar multiplication and publishing the final value for the scalar multiplication as the public key. In other aspects of the present application, a mobile communication device is provided for carrying out this method and a computer readable medium is provided for adapting a processor to carry out this method.

In accordance with another aspect of the present application there is provided a method for countering power analysis attacks on an operation to determine an elliptic curve scalar multiplication product of a scalar and a base point on an elliptic curve, the base point having a prime order. The method includes defining a table of odd multiples of the base point, shifting the scalar right to create a shifted scalar and translating the shifted scalar to a base $2^w$, where w is a window size, thereby forming a translated, shifted scalar. The method further includes determining, based on the translated, shifted key and the table, an initial value for a scalar multiplication of the scalar and the base point and determining, based on the translated, shifted scalar and the table, a final value for the scalar multiplication product.

Other aspects and features will become apparent to those of ordinary skill in the art upon review of the following description of exemplary embodiments in conjunction with the accompanying figures.

As a countermeasure to SPA attacks, a fixed-sequence window method is suggested in N. Thériault, "SPA resistant left-to-right integer recodings", *Selected Areas in Cryptography—SAC '05, LNCS*, vol. 3897, pp. 345-358, Springer-Verlag, 2006 (hereinafter, "Thériault"), and by Lim in C. H. Lim, "A new method for securing elliptic scalar multiplication against side-channel attacks", *Australian Conference on Information Security and Privacy—ACISP '04, LNCS*, vol. 3108, pp. 289-300, Springer-Verlag, 2004 (hereinafter, "Lim").

In overview, steps in a method of generating a public key in a Elliptic Curve Cryptosystem are presented in FIG. 1. The method features a novel fixed-sequence window method of performing a scalar multiplication operation. The inputs to the novel fixed-sequence window method include: a scalar, private n-bit key, k; a base point, P; and a window size, w. Initially, a processor executing the method defines a Table, T, (step 102) as having $2^w$ elements. Details of the definition of the table and the values of the elements of the Table are presented hereinafter in conjunction with a discussion of FIG. 2. The processor also shifts the private key right (step 104). In conjunction with the shifting, the processor translates the shifted private key to the base $2^w$, $$k' = SHR(k) = (K'_{d-1} \ldots K'_0)_{2^w}. \tag{0.4}$$

Where the function SHR( ) acts to shift a binary number right by one bit. The translated, shifted private key, k', has d digits, where d is the smallest integer larger than a quotient obtained by dividing a dividend that is the number of bits, n, in the private key by a divisor that is the window size, w. The processor then uses the most significant digit, i.e., digit (d−1), of the shifted and translated private key to determine an initial value (step 106) for the public key, $$Q \leftarrow T[K'_{d-1} + 2^{w-1}]. \tag{0.5}$$

The initial value for the public key is used by the processor in determining (step 108) a final value for the public key, Q. Details of the determining the final value of the public key are presented hereinafter in conjunction with a discussion of FIG.

3. Finally, given that the final value of the public key has been determined, the processor publishes (step 110) the public key, Q.

Figure 2:
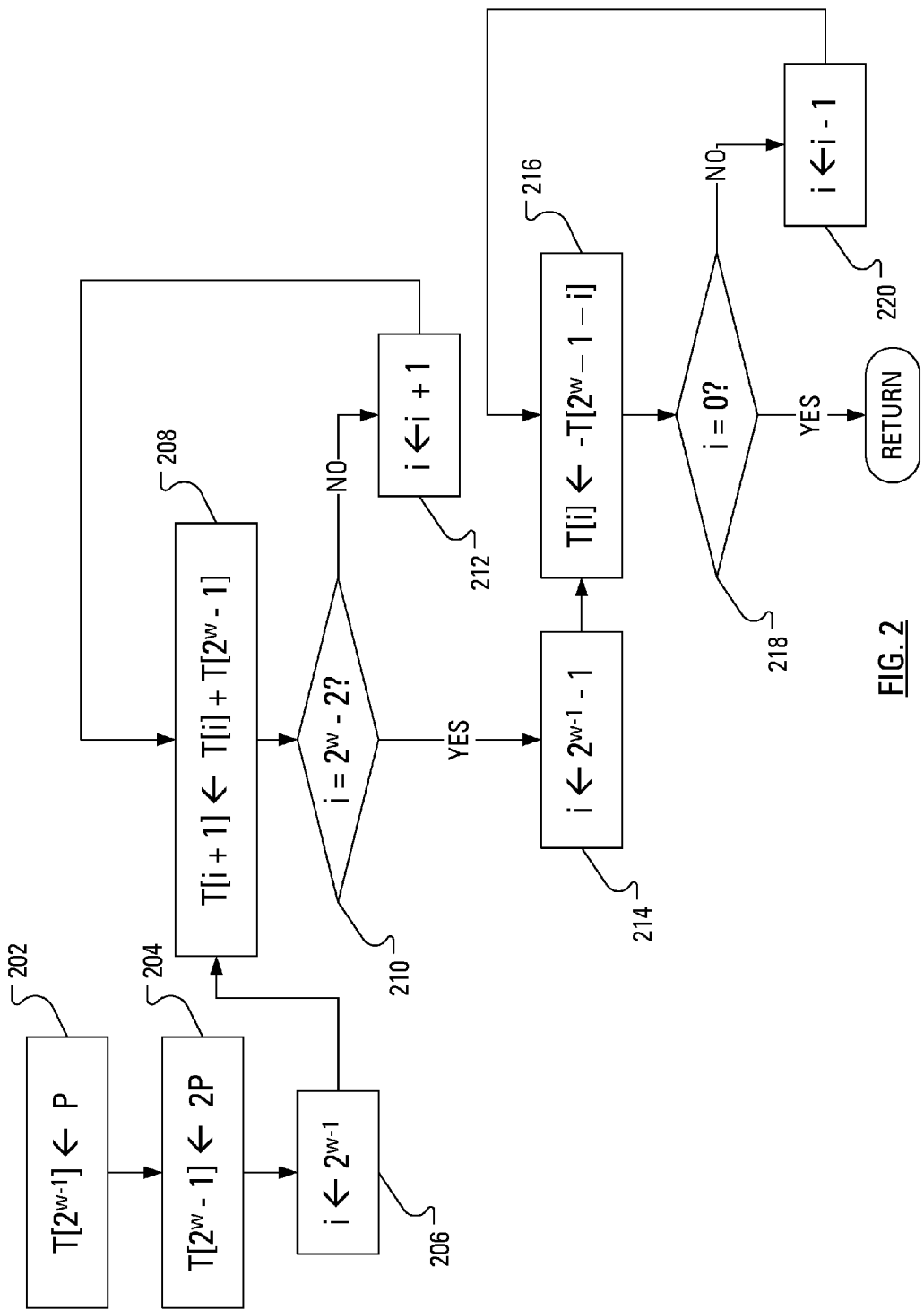
FIG. 2 illustrates steps of an example method of defining a table as required by the method of FIG. 1.

The steps presented in FIG. 2 to define and populate the table T assist in countering an SPA attack on the scalar multiplication that is used to determine the public key. Initially, the processor assigns (step 202) the base point P to the element of the table T with the index $2^{w-1}$, $$T[2^{w-1}] \leftarrow 2P. \qquad (0.6)$$

The processor then assigns (step 204) twice the base point P to the element of the table T with the index $(2^w-1)$, $$T[2^w-1] \leftarrow 2P. \qquad (0.7)$$

Once these two elements of the table T have been initialized, the values stored in the initialized elements may be used to generate values for storing in the remaining elements. To this end, the processor initializes (step 206) an iteration index, i, to $2^{w-1}$ and populates (step 208) the element of the table T having an index of i+1 according to the rule:

$$T[i+1] \leftarrow T[i] + T[2^w-1]. \qquad (0.8)$$

After determining (step 210) that the iteration index has not surpassed $2^w-2$, the processor increments (step 212) the iteration index and populates (step 208) the next element of the table T.

Upon determining (step 210) that the iteration index has reached $2^w-2$, the processor re-initializes (step 214) the iteration index, i, to $(2^{w-1}-1)$ and populates (step 216) the element of the table T with an index of $(2^{w-1}-1)$, $$T[i] \leftarrow -T[2^w-1-i]. \qquad (0.9)$$

After determining (step 218) that the iteration index has not yet been reduced to zero, the processor decrements (step 220) the iteration index and populates (step 216) another one of the elements of the table T having an index less than $2^{w-1}$. After determining (step 218) that the iteration index has been reduced to zero, it may be considered that the table definition step (step 102, FIG. 1) is complete. In particular, each element of the table T stores the base point P multiplied by an odd integer ranging from $-(2^w-1)$ to $(2^w-1)$. Advantageously, the definition and population of the table T is independent of the private key.

Figure 3:
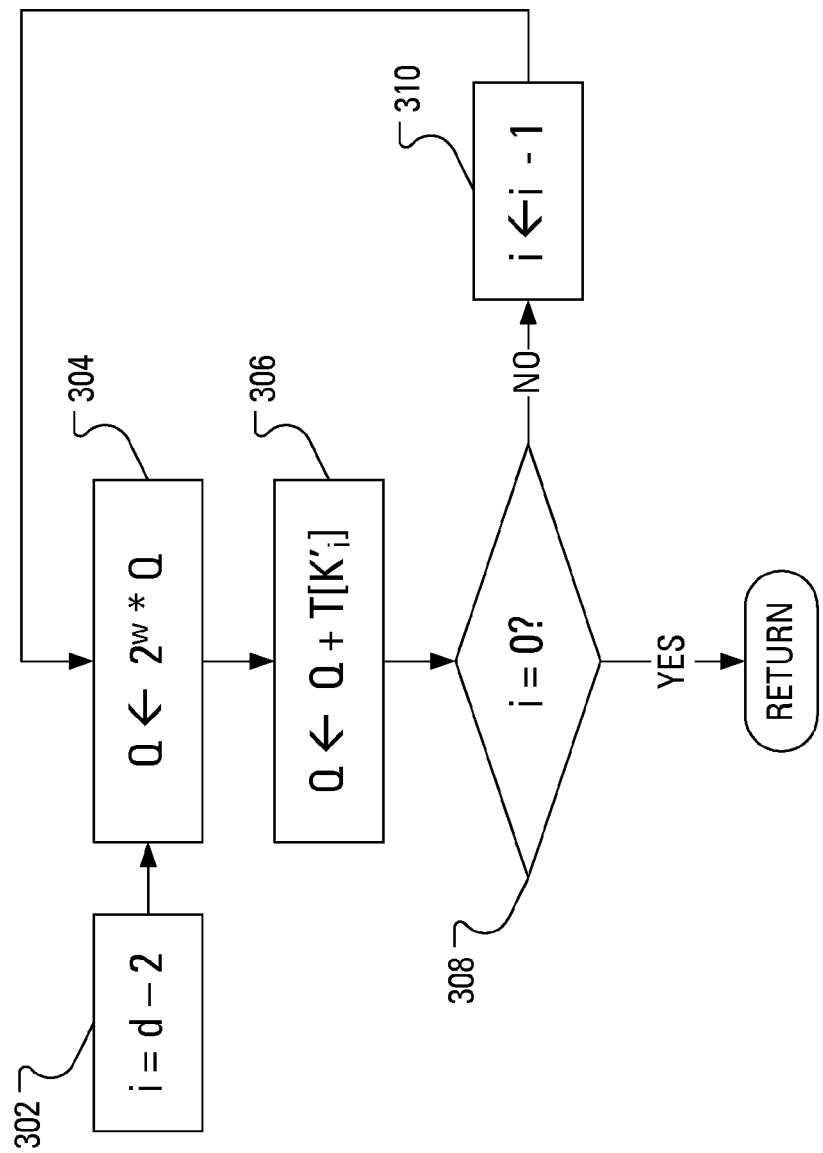
FIG. 3 illustrates steps of an example method of determining a final value for a product as required by the method of FIG. 1.

Turning, now, to FIG. 3, steps are presented in an example method for determining (step 108, FIG. 1) a final value for the public key, Q. In the initial step in the example method for determining a final value for the public key, the processor initializes (step 302) an iteration index i to the value (d−2). Recall that d is the number of base-$2^w$ digits in the translated, shifted private key.

The processor next performs a pair of steps once for each of the remaining digits of the shifted and translated private key. In the first step of the pair of steps, the processor next doubles the public key a number of times equivalent to the window size and assigns (step 304) the product to the public key, $$Q \leftarrow 2^w Q. \qquad (0.10)$$

In the second step of the pair of steps, the processor adds the public key to the value stored in the element of the table T indexed by a digit of the shifted and translated private key, $$Q \leftarrow Q + T[K'_i]. \qquad (0.11)$$

After determining (step 308) that the iteration index has not yet been reduced to zero, the processor decrements (step 310) the iteration index and performs the pair of steps (step 304 and step 306) again. After determining (step 308) that the iteration index has been reduced to zero, it may be considered that the final value determination step (step 108, FIG. 1) is complete. In particular, it may be considered that the scalar multiplication kP=Q is complete.

When the method of FIG. 1 is considered in terms of traditional metrics used to quantify cryptographic procedures, it may be seen that the cost in storage of the method of FIG. 1 is $2^w$ points. Furthermore, the time for the table definition may be represented by a single doubling operation and $(2^{w-1}-1)$ addition operations or: $1D+(2^{w-1}-1)A$. The running time may be quantified as $[(d-1)w]$ doubling operations and $(d-1)$ addition operations or: $(d-1)wD+(d-1)A$. For completeness, note that the method of FIG. 1 requires w point negations that are of negligible cost.

Figure 4:
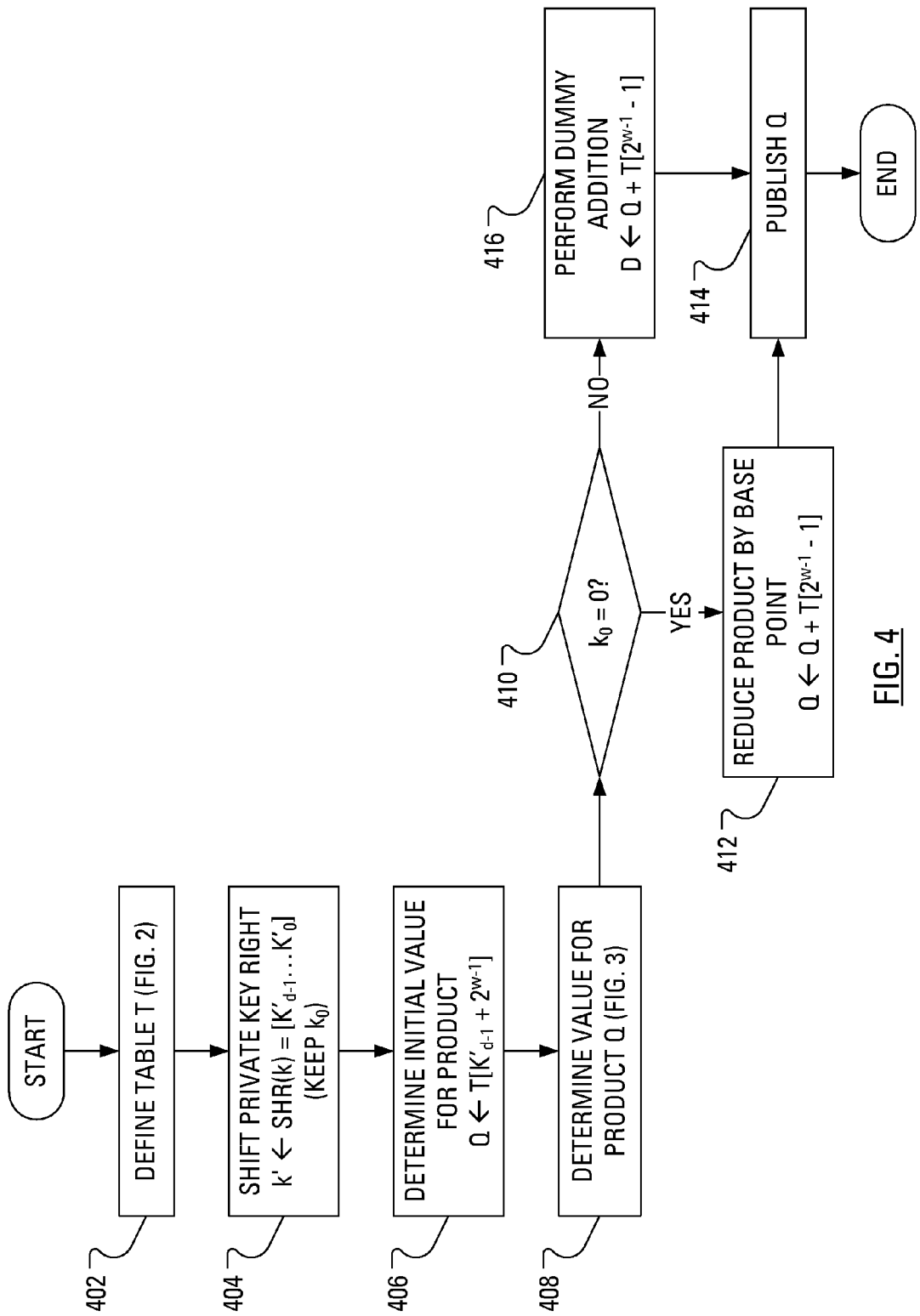
FIG. 4 illustrates steps of an example method of publishing a public key according to an embodiment as an alternative to the method of FIG. 1.

The method of FIG. 1 includes an assumption that k is an odd integer. To handle situations wherein k is not odd, a method is proposed in FIG. 4. Initially, a processor executing the method defines a Table, T, (step 402) as having $2^w$ elements. Details of the definition of the table and the values of the elements of the Table have been presented hereinbefore in conjunction with a discussion of FIG. 2. The processor also shifts the private key right (step 404). In conjunction with the shifting, the processor translates the shifted private key to the base $2^w$, as shown in equation (0.4). Distinct from the shifting of step 104, as part of the shifting of step 404, the processor stores, for later use, the least significant bit, $k_0$, of the private key. The processor then uses the most significant digit, i.e., digit (d−1), of the shifted and translated private key to determine (step 406) an initial value for the public key, as shown in equation (0.5). The initial value for the public key is used by the processor in determining (step 408) a value for the public key, Q. Details of the determining of the value of the public key have been presented hereinbefore in conjunction with a discussion of FIG. 3.

Subsequently, the processor determines (step 410) whether the private key is even or odd. Since the least significant bit shifted out of the public was stored in step 404, the processor may determine (step 410) that the private key is even by determining that the least significant bit, $k_0$, has a zero value. Upon determining that the private key is even, the processor subtracts (step 412) the base point P from the value of Q determined in step 408, that is, the processor performs a point addition described by $Q+T[2^{w-1}-1]$. Recall that the value stored in $T[2^{w-1}-1]$ is −P. Finally, given that the value of the public key has been determined, the processor publishes (step 414) the public key, Q.

Upon determining (step 410) that the private key is odd, no change to the public key, Q, is necessary. However, to maintain equivalent computational effort, the processor performs (step 416) a dummy point addition before publishing (step 414) the public key, Q. One manner in which the dummy point addition of step 416 may be performed is by performing the same point addition as is performed in step 412, i.e., the processor performs a point addition described by $Q+T[2^{w-1}-1]$. However, rather than storing the sum in Q, the processor stores the sum in a distinct buffer (called "D" in FIG. 4), reference to which is not otherwise made.

It is known that, for prime fields, it is more efficient to represent the base point P using affine coordinates and to represent the public key Q using Jacobian coordinates. Hence, the doubling operation (step 304) is efficiently performed using Jacobian coordinates and the addition operation (step 306) is efficiently performed using Jacobian-affine coordinates.

In the table definition step, the doubling (step 204) can be efficiently performed on affine coordinates to obtain 2P, which is then used in the subsequent additions in step 208. Therefore, the additions in step 208 can be efficiently performed using Jacobian-affine coordinates and then all the points can be converted to affine coordinates, the cost of each conversion being 1I+3M+1S. Using a simultaneous inversion technique, we can save $2^{w-1}-2$ inversions by replacing the inversions by $3(2^{w-1}-2)$ multiplications. This is particularly useful for prime fields where 1I≈80M. The cost of this conversion may be shown to be $1I+3(2^{w-1}-2)M+(2^{w-1}-1)(3M+1S)=1I+3(2^{w-3})M+(2^{w-1}-1)S$. This technique is also useful for binary fields if the computational cost of an inversion exceeds the computational cost of three multiplications. Note that for binary fields, the Lopez-Dahab coordinates are more efficient than the Jacobian coordinates.

Figure 5:
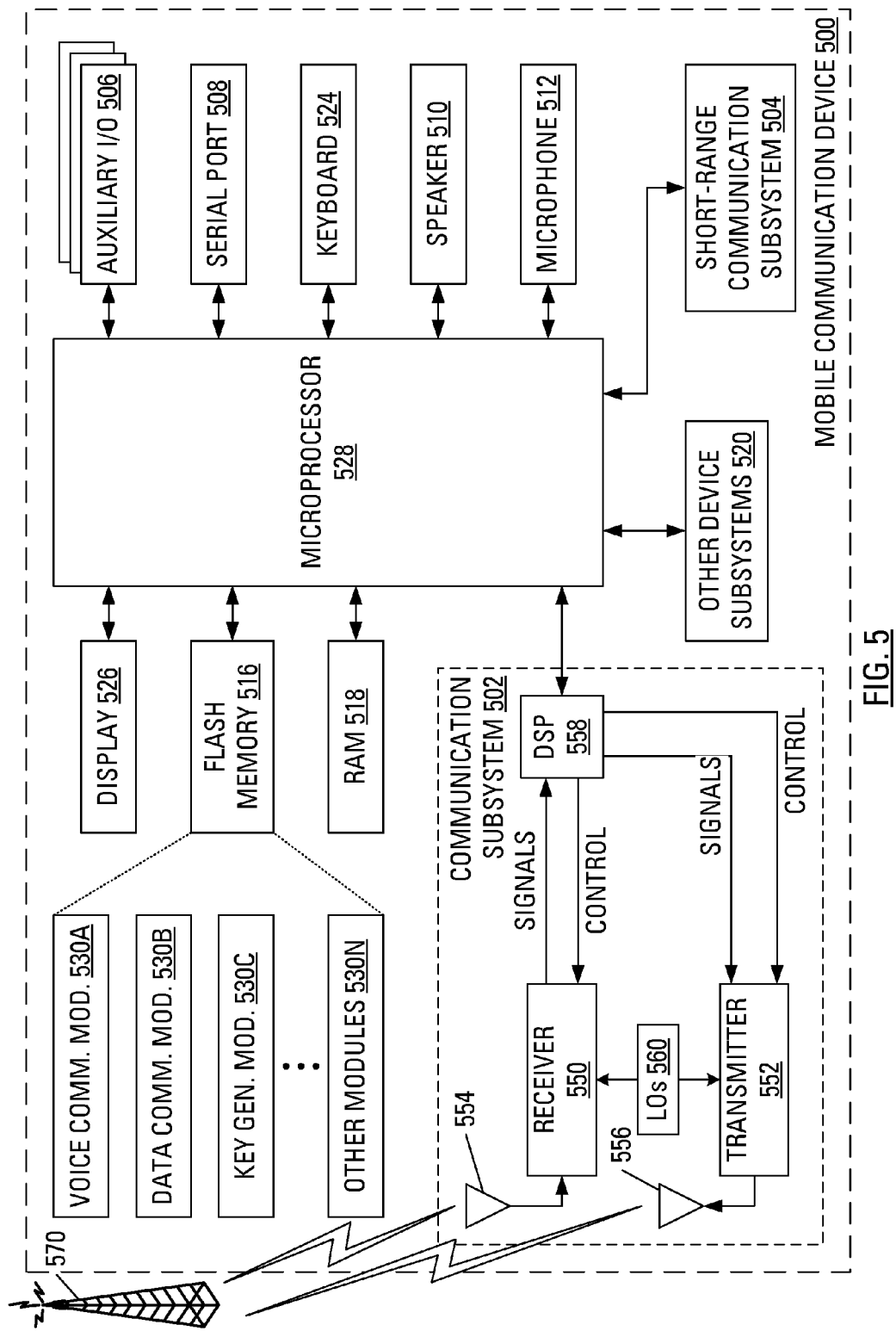
FIG. 5 illustrates an apparatus for carrying out the method of FIG. 1.

FIG. 5 illustrates a mobile communication device 500 as an example of a device that may carry out the method of FIG. 1. The mobile communication device 500 includes a housing, an input device (e.g., a keyboard 524 having a plurality of keys) and an output device (e.g., a display 526), which may be a full graphic, or full color, Liquid Crystal Display (LCD). In some embodiments, the display 526 may comprise a touchscreen display. In such embodiments, the keyboard 524 may comprise a virtual keyboard. Other types of output devices may alternatively be utilized. A processing device (a microprocessor 528) is shown schematically in FIG. 5 as coupled between the keyboard 524 and the display 526. The microprocessor 528 controls the operation of the display 526, as well as the overall operation of the mobile communication device 500, in part, responsive to actuation of the keys on the keyboard 524 by a user.

The housing may be elongated vertically, or may take on other sizes and shapes (including clamshell housing structures). Where the keyboard 524 includes keys that are associated with at least one alphabetic character and at least one numeric character, the keyboard 524 may include a mode selection key, or other hardware or software, for switching between alphabetic entry and numeric entry.

In addition to the microprocessor 528, other parts of the mobile communication device 500 are shown schematically in FIG. 5. These may include a communications subsystem 502, a short-range communications subsystem 504, the keyboard 524 and the display 526. The mobile communication device 500 may further include other input/output devices, such as a set of auxiliary I/O devices 506, a serial port 508, a speaker 510 and a microphone 512. The mobile communication device 500 may further include memory devices including a flash memory 516 and a Random Access Memory (RAM) 518 and various other device subsystems 520. The mobile communication device 500 may comprise a two-way radio frequency (RF) communication device having voice and data communication capabilities. In addition, the mobile communication device 500 may have the capability to communicate with other computer systems via the Internet.

Operating system software executed by the microprocessor 528 may be stored in a computer readable medium, such as the flash memory 516, but may be stored in other types of memory devices, such as a read only memory (ROM) or similar storage element. In addition, system software, specific device applications, or parts thereof, may be temporarily loaded into a volatile store, such as the RAM 518. Communication signals received by the mobile device may also be stored to the RAM 518.

The microprocessor 528, in addition to its operating system functions, enables execution of software applications on the mobile communication device 500. A predetermined set of software applications that control basic device operations, such as a voice communications module 530A and a data communications module 530B, may be installed on the mobile communication device 500 during manufacture. A public key generation module 530C may also be installed on the mobile communication device 500 during manufacture, to implement aspects of the present disclosure. As well, additional software modules, illustrated as an other software module 530N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 570 represented by a radio tower. The data items managed by the PIM application may be seamlessly integrated, synchronized and updated via the wireless carrier network 570 with the device user's corresponding data items stored or associated with a host computer system.

Communication functions, including data and voice communications, are performed through the communication subsystem 502 and, possibly, through the short-range communications subsystem 504. The communication subsystem 502 includes a receiver 550, a transmitter 552 and one or more antennas, illustrated as a receive antenna 554 and a transmit antenna 556. In addition, the communication subsystem 502 also includes a processing module, such as a digital signal processor (DSP) 558, and local oscillators (LOs) 560. The specific design and implementation of the communication subsystem 502 is dependent upon the communication network in which the mobile communication device 500 is intended to operate. For example, the communication subsystem 502 of the mobile communication device 500 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 500.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 500 may send and receive communication signals over the wireless carrier network 570. Signals received from the wireless carrier network 570 by the receive antenna 554 are routed to the receiver 550, which provides for signal amplification, frequency down conversion, filtering, channel selection, etc., and may also provide analog to digital conversion. Analog-to-digital conversion of the received signal allows the DSP 558 to perform more complex communication functions, such as demodulation and decoding. In a similar manner, signals to be transmitted to the wireless carrier network 570 are processed (e.g., modulated and encoded) by the DSP 558 and are then provided to the transmitter 552 for digital to analog conversion, frequency up conversion, filtering, amplification and transmission to the wireless carrier network 570 (or networks) via the transmit antenna 556.

In addition to processing communication signals, the DSP 558 provides for control of the receiver 550 and the transmitter 552. For example, gains applied to communication signals in the receiver 550 and the transmitter 552 may be adaptively controlled through automatic gain control algorithms implemented in the DSP 558.

In a data communication mode, a received signal, such as a text message or web page download, is processed by the communication subsystem 502 and is input to the microprocessor 528. The received signal is then further processed by the microprocessor 528 for output to the display 526, or alternatively to some auxiliary I/O devices 506. A device user may also compose data items, such as e-mail messages, using the keyboard 524 and/or some other auxiliary I/O device 506, such as a touchpad, a rocker switch, a thumb-wheel, a trackball, a touchscreen, or some other type of input device. The composed data items may then be transmitted over the wireless carrier network 570 via the communication subsystem 502.

In a voice communication mode, overall operation of the device is substantially similar to the data communication mode, except that received signals are output to a speaker 510, and signals for transmission are generated by a microphone 512. Alternative voice or audio I/O subsystems, such as a voice message recording subsystem, may also be implemented on the mobile communication device 500. In addition, the display 526 may also be utilized in voice communication mode, for example, to display the identity of a calling party, the duration of a voice call, or other voice call related information.

The short-range communications subsystem 504 enables communication between the mobile communication device 500 and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method, for being performed by a computer system, of publishing a public key Q for an Elliptic Curve Cryptosystem given a private key k, a base point P and a window size w, said method for countering power analysis attacks, said method comprising:
   defining a table of odd multiples of said base point;
   shifting said private key right to create a shifted private key;
   translating said shifted private key to a base $2^w$, thereby forming a translated, shifted key;
   determining, based on said translated, shifted key and said table, an initial value for a scalar multiplication of said private key k and said base point P;
   determining, based on said translated, shifted key and said table, a final value for said scalar multiplication, said determining said final value including:
      determining that said private key k is even; and
      upon determining that said private key k is even, subtracting said base point P from said final value; and
   publishing said final value for said scalar multiplication as said public key.

2. The method of claim 1 wherein said translated, shifted key includes a plurality of digits and wherein said determining said initial value comprises:
   determining a sum of $2^{w-1}$ and a most significant digit of said plurality of digits; and
   assigning, to said initial value for said scalar multiplication, a value in an element of said table indexed by said sum.

3. The method of claim 2 wherein said determining said final value for said scalar multiplication comprises:
   for each digit of said plurality of digits, other than said most significant digit:
      doubling a current value for said scalar multiplication a number of times equivalent to said window size to form an interim product;
      assigning said interim product to said current value for said scalar multiplication;
      determining an interim sum of said current value for said scalar multiplication and a value in an element of said table indexed by said each digit; and
      assigning said interim sum to said current value for said scalar multiplication;
   when a value in an element of said table indexed by a least significant digit has been used in said determining said interim sum, assigning said current value for said scalar multiplication to said final value for said scalar multiplication.

4. The method of claim 1 wherein said odd multiples of said base point P range from $-(2^w-1)P$ to $(2^w-1)P$.

5. A mobile communication device comprising:
   a memory storing a private key k, a base point P and a window size w;
   a processor, coupled to said memory, said processor configured to:
      define a table of odd multiples of said base point;
      shift said private key right to create a shifted private key;
      translate said shifted private key to a base $2^w$, thereby forming a translated, shifted key;
      determine, based on said translated, shifted key and said table, an initial value for a scalar multiplication of said private key k and said base point P;
      determine, based on said translated, shifted key and said table, a final value for said scalar multiplication, wherein, to determining said final value said processor is configured to:
         determine that said private key k is even; and
         subtract said base point P from said final value; and
      publish said final value for said scalar multiplication as a public key Q for an Elliptic Curve Cryptosystem.

6. The mobile communication device of claim 5 wherein said translated, shifted key includes a plurality of digits and wherein, to determine said initial value, said processor is further configured to:
   determine a sum of a most significant digit of said plurality of digits and $2^{w-1}$; and assign, to said initial value for said scalar multiplication, a value in an element of said table indexed by said sum.

7. The mobile communication device of claim 6 wherein, to determine said final value for said scalar multiplication, said processor is further configured to:

for each digit of said plurality of digits, other than said most significant digit:
- double a current value for said scalar multiplication a number of times equivalent to said window size to form an interim product;
- assign said interim product to said current value for said scalar multiplication;
- determine an interim sum of said current value for said scalar multiplication and a value in an element of said table indexed by said each digit; and
- assign said interim sum to said current value for said scalar multiplication;

when a value in an element of said table indexed by a least significant digit has been used in said determining said interim sum, assign said current value for said scalar multiplication to said final value for said scalar multiplication.

8. The mobile communication device of claim 5 wherein said odd multiples of said base point P range from $-(2^w-1)P$ to $(2^w-1)P$.

9. A computer readable medium containing computer-executable instructions that, when performed by a processor given a private key k, a base point P and a window size w, cause said processor to:
- define a table of odd multiples of said base point;
- shift said private key right to create a shifted private key;
- translate said shifted private key to a base $2^w$, thereby forming a translated, shifted key;
- determine, based on said translated, shifted key and said table, an initial value for a scalar multiplication of said private key k and said base point P;
- determine, based on said translated, shifted key and said table, a final value for said scalar multiplication, wherein, to determining said final value, said instructions cause said processor to:
  - determine that said private key k is even; and
  - subtract said base point P from said final value; and
- publish said final value for said scalar multiplication as a public key Q for an Elliptic Curve Cryptosystem.

10. The computer readable medium of claim 9 wherein said translated, shifted key includes a plurality of digits and wherein, to determine said initial value, said computer-executable instructions further cause said processor to:

determine a sum of a most significant digit of said plurality of digits and $2^{w-1}$; and assign, to said initial value for said scalar multiplication, a value in an element of said table indexed by said sum.

11. The computer readable medium of claim 9 wherein, to determine said final value for said scalar multiplication, said computer-executable instructions further cause said processor to:

for each digit of said plurality of digits, other than said most significant digit:
- double a current value for said scalar multiplication a number of times equivalent to said window size to form an interim product;
- assign said interim product to said current value for said scalar multiplication;
- determine an interim sum of said current value for said scalar multiplication and a value in an element of said table indexed by said each digit; and
- assign said interim sum to said current value for said scalar multiplication;

when a value in an element of said table indexed by a least significant digit has been used in said determining said interim sum, assign said current value for said scalar multiplication to said final value for said scalar multiplication.

12. The computer readable medium of claim 9 wherein said odd multiples of said base point P range from $-(2^w-1)P$ to $(2^w-1)P$.

13. A method, for being performed by a computer system, of countering power analysis attacks on an operation to determine an elliptic curve scalar multiplication product of a scalar and a base point on an elliptic curve, said base point having a prime order, said method comprising:
- defining a table of odd multiples of said base point;
- shifting said scalar right to create a shifted scalar;
- translating said shifted scalar to a base $2^w$, where w is a window size, thereby forming a translated, shifted scalar;
- determining, based on said translated, shifted key and said table, an initial value for a scalar multiplication of said scalar and said base point, said determining said final value including:
  - determining that said private key k is even; and
  - upon determining that said private key k is even, subtracting said base point P from said final value; and
- determining, based on said translated, shifted scalar and said table, a final value for said scalar multiplication product.

* * * * *